No. 781,990. PATENTED FEB. 7, 1905.
A. A. BALL, Jr.
FRAME FOR SELF PROPELLED VEHICLES.
APPLICATION FILED OCT. 14, 1903.

Witnesses

Inventor,
Augustus A. Ball Jr,
By Albert H. Dan
Att'y.

Fig. 2.

No. 781,990. PATENTED FEB. 7, 1905.
A. A. BALL, Jr.
FRAME FOR SELF PROPELLED VEHICLES.
APPLICATION FILED OCT. 14, 1903.

Witnesses
Ewing R Lumey
Helen Oxford

Inventor
Augustus A. Ball Jr.
By Albert G. Davis
Atty.

No. 781,990. PATENTED FEB. 7, 1905.
A. A. BALL, Jr.
FRAME FOR SELF PROPELLED VEHICLES.
APPLICATION FILED OCT. 14, 1903.

Witnesses:
Erving R Kenney
Helen Oxford

Inventor,
Augustus A. Ball Jr.
By Albert G. Davis
Att'y.

No. 781,990. Patented February 7, 1905.

UNITED STATES PATENT OFFICE.

AUGUSTUS A. BALL, JR., OF LYNN, MASSACHUSETTS, ASSIGNOR TO GENERAL ELECTRIC COMPANY, A CORPORATION OF NEW YORK.

FRAME FOR SELF-PROPELLED VEHICLES.

SPECIFICATION forming part of Letters Patent No. 781,990, dated February 7, 1905.

Application filed October 14, 1903. Serial No. 177,047.

*To all whom it may concern:*

Be it known that I, AUGUSTUS A. BALL, Jr., a citizen of the United States, residing at Lynn, in the county of Essex and State of Massachusetts, have invented certain new and useful Improvements in Frames for Self-Propelled Vehicles, of which the following is a specification.

This invention relates to an underframe for self-propelled vehicles. It object is to provide a simple and flexible structure in which separate frames are arranged intermediate the axles and body to rigidly maintain the proper relation between them. The frames are each pivotally hung from the vehicle-body and are rigidly attached to the axles, which latter themselves are movably connected with their arches or other body-supports. In this arrangement the frames have free movement with the body as it rises and falls with respect to the wheels, and at the same time they securely brace the axles.

In the preferred construction of the rear frame for the hind axle the strutting member thereof comprises the motor, which is the source of mechanical power for propelling the vehicle.

The manner of suspension of the motor, its connection with the rear axle, and also the protective and oil-containing casing therefor are novel and essential features of the invention which will be more fully described hereinafter and finally set forth in the claims.

In the accompanying drawings, which illustrate one embodiment of my invention.

Referring to the drawings, 1 represents a vehicle-body; 2, a body-frame, preferably of angle-iron; 3, body-supporting springs; 4, a front axle; 5, a center divided rear axle; 7 and 8, respectively, front and rear axle arches; and 9 the road-wheels of the vehicle. The body 1 has a four-spring suspension of the usual arrangement of two springs at front and rear. The springs 3 are supported rigidly on the arches by being bolted to blocks or seats 10, which are brazed or otherwise rigidly attached to the axle-arches.

The front steering-wheels are mounted on knuckled spindles which are connected to an operating-lever 11 through an intermediate mechanism 12. The rear or driving wheels are mounted on a two-part axle which receives power by means of a suitable differential gear.

The axles are strutted and braced from a central point on the vehicle-body, or preferably the body-frame. The manner of connecting the axles with the point of bracing on the body-frame is such as to afford ample flexibility for permitting the rise and fall of the vehicle-body relatively to the axles, so as to prevent destructive racking and distorting strains as the wheels pass over inequalities in the roadway.

Figure 2:
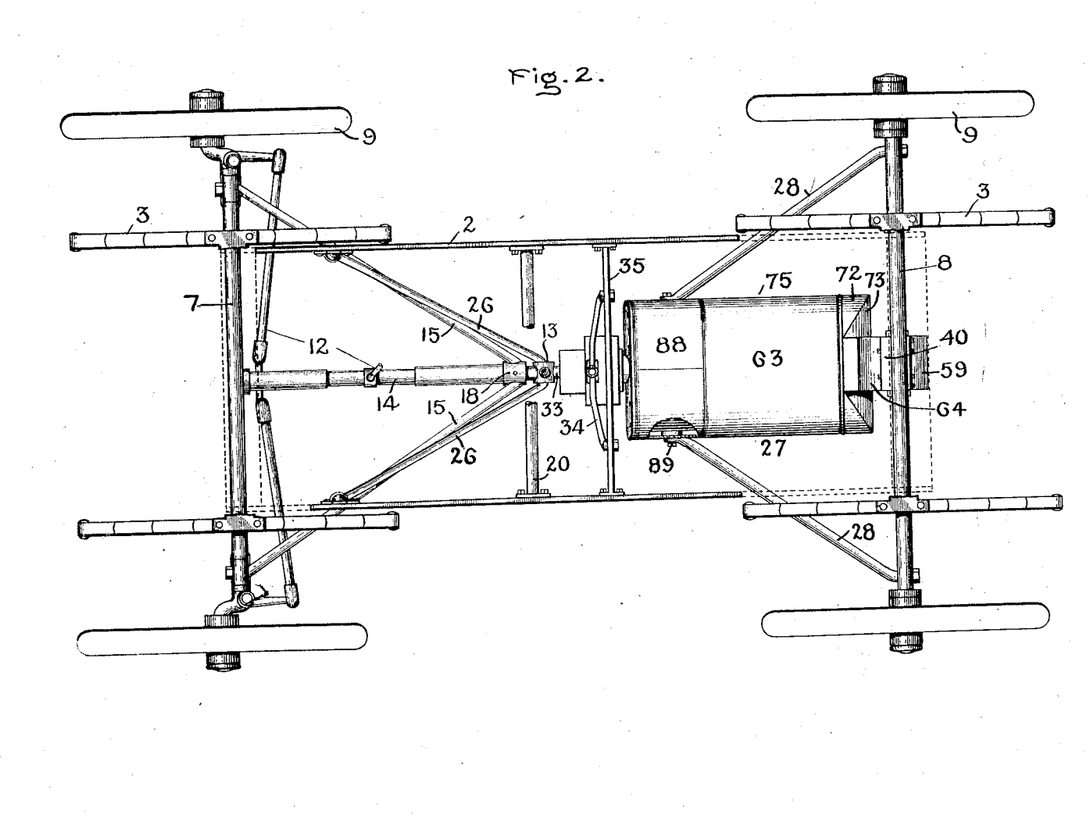
Fig. 2 is a plan view of the running-gear.

As shown in Fig. 2, the axles 4 and 5 are each connected by separate frames with a hanger 13 in a manner to be hereinafter described. The front triangular frame comprises a central strut 14, on which is supported the steering mechanism 12, which is movable therewith, diagonal brace-rods 15, and the front axle 4. The central strut is supported at its front end on an upright post 16, Fig. 3, rigid on the front axle 4. Passing through the post 16 is a bolt 17, that screws into the end of the strut 14, and thereby forms a rigid connection with the axle. The diagonal brace-rods 15 are fixed at their front ends to the axle 4 adjacent the steering-knuckles, while the rear ends are secured rigidly to a collar 18, pinned on the central strut 14. The rear end of the central strut is threaded and screws into a head 19, that pivots in the hanger 13, Figs. 5 and 6.

The hanger depends from a cross-bar 20, arranged on the body-frame 2, approximately at a medial position thereof. It comprises a stud 21, which passes through an eye 22, rigid on the cross-bar 20. This stud screws into a sleeve 23, which carries at its lower end a bearing ring or box 24. This bearing-ring serves as a pivotal center about which the front triangular frame as a whole moves vertically, and it is arranged with its axis or center line parallel to the front axle. The head 19 of the strut 14 of the front triangular frame is pivoted in the bearing-ring to provide for pivotal movement. An elongated opening 25 is provided in the bearing-ring, through which the rear end of the strut passes and screws into the head. By means of this arrangement the front frame is permitted to rise and fall in unison with the body. In order that one front wheel may rise or fall irrespectively of the other, or, in other words, that the front axle may tilt, the front frame as an entirety turns or tilts about the rear end of the central horizontal strut. This tilting movement is permitted by means of the threaded end of the strut 14 turning freely in the head 19. The head tapers toward its end, Figs. 5 and 13, for affording a slight play in the hanger to allow for side lunges of the vehicle-body on the springs without causing undue strains upon the hanger. The hanger is rigidly held in position by tie-rods 26. These tie-rods are bolted at their upper ends to the side bars of the body-frame and are bolted at their lower ends to the bottom of the bearing-ring, as clearly shown in Figs. 1, 3, and 5.

The rear triangular frame comprises a central strut member 27, (which in the present case is shown to be a motor, such as a steam-engine,) diagonal brace-rods 28, and the rear axle 5. The motor is connected with the rear axle through an intervening power-transmitting mechanism, such as gearing, which will be hereinafter explained. The brace-rods 28 may be attached at their front ends to the motor or to the motor support or hanger, and at their rear ends they may be rigidly bolted to the rear axle. This rear triangular frame is flexibly supported by the body-frame, so as to take up shocks and jars incident to travel without producing strains. The connection with the hanger is preferably a ball-and-socket arrangement. A ball 29 is formed on or secured to the central strut member of the rear frame, which is mounted in a socket 30. This socket member also affords means for removably attaching the rear frame to the hanger. For this purpose a forwardly-projecting threaded pin 31 is carried by the socket member 30. The threaded pin engages a double-threaded nut 32, which in turn engages a threaded boss 33 on the hanger 19. As clearly shown in Figs. 5 and 6, the interiorly-threaded boss 33 is provided on the rear of the bearing-ring 24. The nut 32 is interiorly and exteriorly threaded and serves as a coupling between the hanger and the rear triangular frame. The pin 31 extends to a point that permits clearance between its end and the boss 33, when the nut is unscrewed from the boss and run back on the pin, as will be clearly understood by an inspection of Fig. 6.

I do not wish to limit the scope of my invention to a construction employing a steam-engine, since any approved motive-power system may be employed, as a strut member, in connection with my improved frame without affecting the principles of construction. In some cases it may be preferable to employ a bar for the central strut member and dispense with the engine, as serving the function of a strut. For securely bracing the socket member its upper portion is connected with a tie-rod 34, which is bolted at its ends in an arched cross-bar 35, Figs. 2 and 4.

Figure 1:
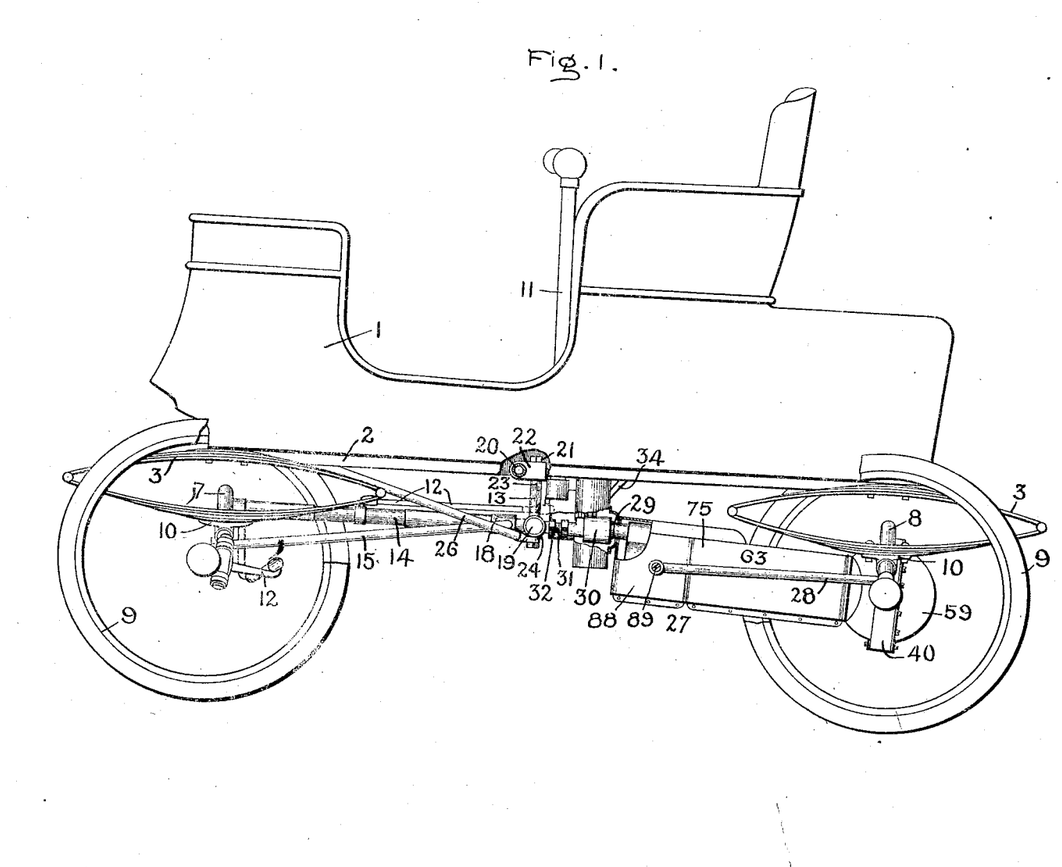
Figure 1 is a side elevation of the improved vehicle with parts thereof broken away for more clearly illustrating the details.

The pivotal centers of the triangular frames are above the plane of the axles, as shown in Fig. 1, so that the frames incline toward each other. As the vehicle-body rises and falls the angle of inclination of the frames varies, and as the frames are rigid with the axles it is necessary to support them in such a manner as to permit movement with the frames. For this purpose the axles are pivoted on their arches. The axle-arches 7 and 8 are each provided with pivot-lugs 36 at their ends, and the axles 4 and 5 are each provided with sockets 37, into which the lugs 36 of the respective arches extend, Figs. 3 and 4. By means of this arrangement the axles are capable of a limited oscillatory movement as the body rises and falls to permit the angles of inclination of the triangular frames to change correspondingly. The sockets are brazed or otherwise rigidly secured to the axles, and the distance between the sockets of each axle is fixed so as to afford pivotal connections between the axles and arches of a firm and substantial character.

Taking up more in detail the construction of the rear triangular frame, it will be observed that the various members which comprise the frame are preferably detachably connected. This feature permits of the members being readily assembled when setting up the frame or removed for the purpose of adjusting the motive parts or for replacing any members in case wear or other injury should demand duplication thereof. Each half of the rear axle can be independently removed from the triangular frame and also the central strut member. In other words, the engine and its supporting means can be removed without disturbing the parts of the rear axle. While the members are thus removable, they are suitably proportioned and rigidly connected, so that the frame as a whole is of a substantial character.

Figure 10:
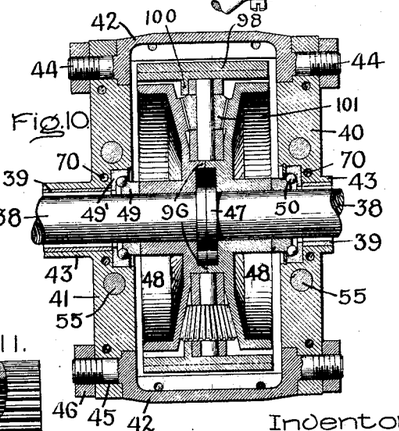
Fig. 10 is a similar section on line 10 10, Fig. 7, drawn on an enlarged scale.

The rear axle 5 comprises divided live shafts or axles 38, sleeves 39 therefor, and a differential yoke 40, connecting the sleeves. The differential yoke, Fig. 10, is constructed of side plates 41 and top and bottom plates 42. The side plates are provided with bosses 43, in which the inner ends of the sleeves 39 are brazed. The plates of the yoke are bolted together, preferably by means of integrally-threaded lugs 44 on the top and bottom plates, which project through openings 45 in the ends of the side plates, and nuts 46, which screw on the lugs, hold the side plates in rigid engagement with the intermediate top and bottom plates.

The live axles 38 are mounted in the sleeves on ball-bearings. The inner ends of the live axles are provided with annular flanges 47, which form shoulders against which the hubs of bevel gear-wheels 48 abut. The wheels 48 are keyed to the live axles and are held rigidly thereon between the annular flanges and bearing-cone 49, which latter are tight on the live axles. In order to assemble the axles 38 in the sleeves, it is necessary to insert them from the differential yoke ends. A bearing-cup 49' is seated in each side plate of the differential yoke, forming the raceway for antifriction-balls 50. The outer end bearings for the live axles are housed in enlarged cup-shaped portions of the socket-fittings 37, Fig. 4, each of which comprises an adjustable cone-and-cup ball-bearing of usual construction, and accordingly the details thereof are not shown. The road-wheel may be keyed to the live axles in any desired manner. The bearings at each end of the live axles are adjusted by means of the adjustable cones of the outer bearings. As the axle-sleeves are separable from each other and detachable also from the supporting-arch, the live axles can be readily inserted into or removed therefrom. The bearings can therefore be adjusted before putting the rear triangular frame together. By this construction each axle-sleeve, its side plate, the half of the live axle contained in the sleeve, the bevel gear-wheel on the end of the live axle, and the attached road-wheel may be regarded as a separable unit that forms part of the rear triangular frame. Thus the rear triangular frame consists, in general terms, of two detachable units forming the complete rear-axle structure, and the engine and its supporting means comprise a third detachable unit.

Figures 3, 5, 12, 13:
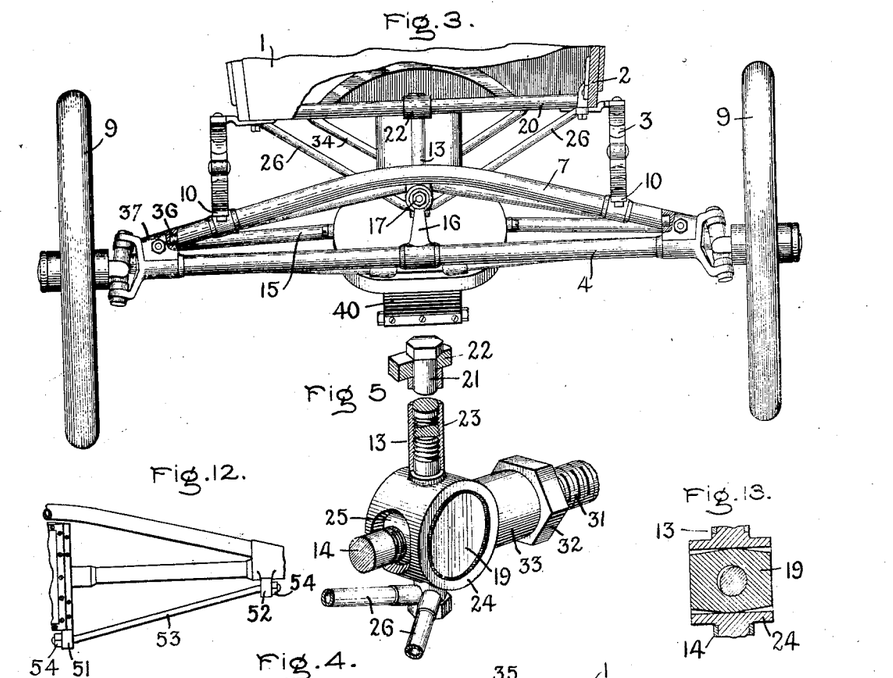
Figs. 3 and 4 are respectively a front view and a rear view of the running-gear.
Figs. 5 and 6 are details of the hanging and flexible suspending means by which the separate frames are connected with the body.
Fig. 12 is a partial view of a modified form of rear axle which embodies an extra bracing member.
Fig. 13 is a detail section of the pivotal hanging connection for the rear end of the front frame.
Figures 4, 6:
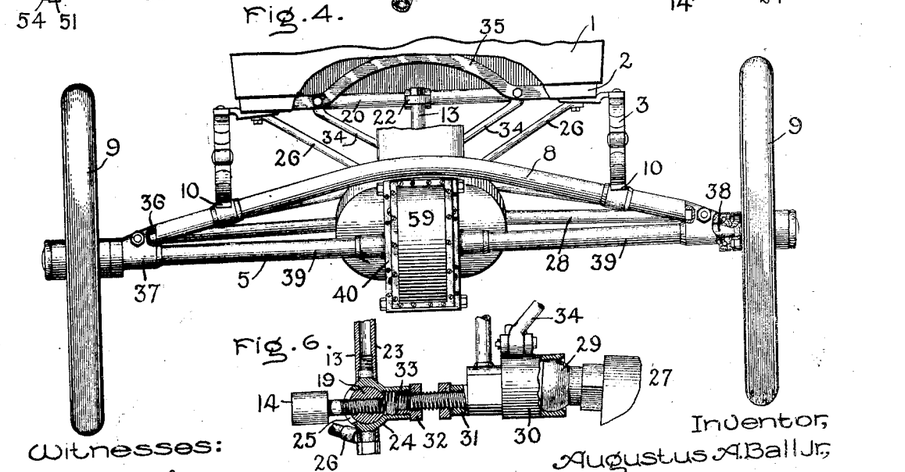

In the modification of the rear-axle structure, Fig. 12, the side plates of the yoke and the sockets at the outer ends of the axle-sleeves are provided with eye-lugs 51 and 52, respectively, and brace-rods 53, one at each half of the axle, which extends between a socket and side plate, and its ends, which are screw-threaded, pass through the eye-lugs, where nuts 54, screwing on the ends and drawing up against the lugs, hold the parts stiffly together, and thereby strutted. Each half of the axle structure is thus rendered more rigid and is still separable from the axle-arch, as in the construction hereinbefore described.

Figure 7:
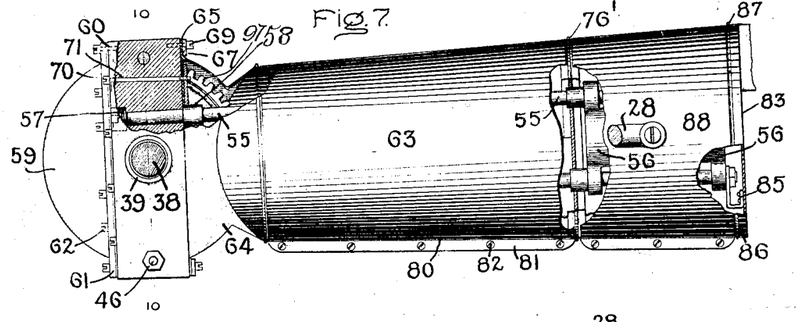
Figs. 7 and 8 are respectively a side elevation and a plan of the differential yoke, the motor structure, and the casing for the latter, which together form the central strut of the rear one of the frames.

The central strut of the rear triangular frame, as hereinbefore referred to, consists of an engine and its supporting means. The essential feature in this connection is the means of connecting the rear portion of the central strut member with the rear-axle structure. For this purpose supporting-rods 55 are provided, the front ends of which are attached to the cylinders 56 of the engine and the rear ends to the differential yoke. The rods 55 support part of the motive elements of the engine and the pinion for driving the differential gear. They are preferably four in number and arranged in parallel relation. Their rear ends pass through the side plates of the differential yoke and are rigidly secured therein by threaded nuts 57. Shoulders 58 are formed on the rods, and by means of the nuts 57 the rods are held in place, with their shoulders abutting solidly upon the front surfaces of the side plates, Fig. 7.

Figure 14:
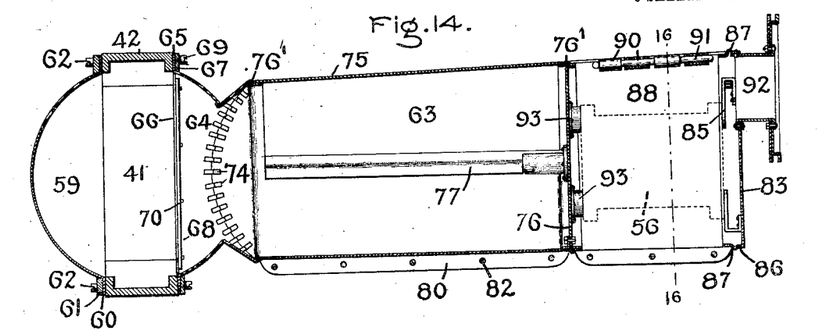
Fig. 14 is a vertical longitudinal section through the differential and engine casing, showing an oil-tight structure.
Figure 15:
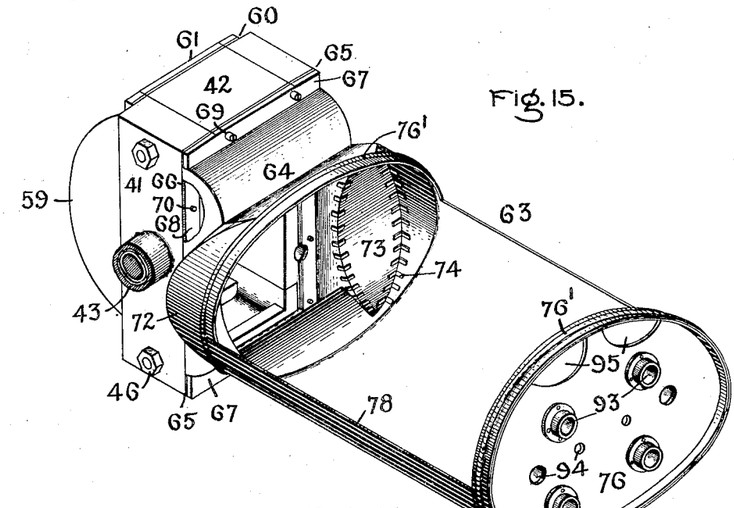
Fig. 15 is a perspective view of a principal part of said structure.

The gearing and engine are inclosed and protected in an oil-containing casing, and the wearing parts of the operating mechanism are lubricated by the lubricant splashing on the same. The casing is constructed with the object in view of having the parts so organized as to permit of ready assembling or removal and having the joints of the parts in oil-tight contact. In this connection the front and rear surfaces of the plates 41 and 42 of the differential yoke are flush and carefully finished for the purpose of obtaining close-fitting relation with the gear-casing, Figs. 7, 14, and 15. The rear section of the casing is a detachable cap 59, which is provided with a circumferential flange 60, fitting the rear surface of the yoke. A frame 61, rectangular in shape to correspond with the yoke, is arranged around the cap 59 and overlies the flange 60, Figs. 4 and 7. This frame serves to reinforce the flange, as well as to insure a uniform contact thereof with the yoke. The frame and cap are secured to the yoke by screws 62, which pass through registering openings in the frame and cap and screw into the plates of the yoke, Figs. 4, 7, and 14.

Figure 8:
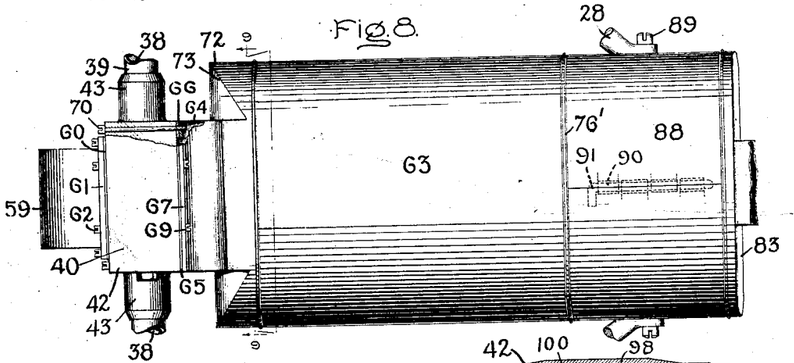

The main or front part of the casing comprises an engine-section 63 and a gear-section 64, forming a single rigid structure. The gear-section is rectangular at its rear end where it is presented to the yoke, and in its vertical dimension it contracts toward the front end, where it connects with the engine-section in general conformity to the shape of the gearing contained therein. The upper and lower edges of the rear end are turned outwardly to form exterior flanges 65, and the side edges are turned inwardly to form interior flanges 66, Figs. 8, 14, and 15. These flanges fit against the front surface of the yoke and are overlaid and held in close contact with said surface by reinforcing-plates 67 and 68. The exterior plates 67 secure the flanges 65 in place by means of screws 69, which are easily accessible from points over and under the engine-section of the casing, whereas the interior plates 68 and flanges 66 are secured in place by long shanked screws 70, which pass through holes 71, Figs. 7 and 10, extending the full width of the side plates of the yoke and accessible from the rear. Portions of the engine-section of the casing extend beyond the gear-section, so that for convenience of accessibility the screws 70 are inserted from the rear.

Figures 9, 11:
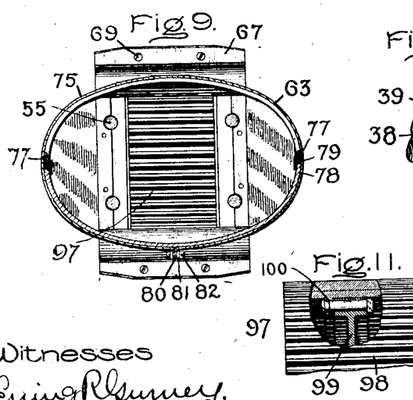
Fig. 9 is a transverse section on line 9 9, Fig. 8.
Fig. 11 is a fragmentary detail view of the differential spur.
Figure 16:
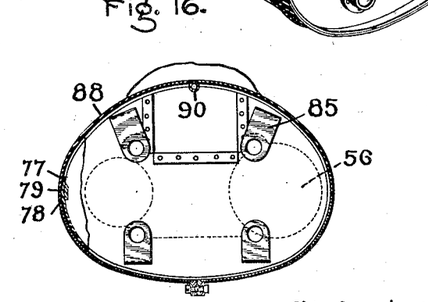
Fig. 16 is a vertical transverse section of the engine-cylinder-inclosing section of the casing, taken on line 16 16, Fig. 14.

The engine-section 63 is substantially elliptical in transverse section to accommodate the engine structure, and the portion thereof that connects with the contracted end of the gear-section forms lateral extensions or shoulders 72. The casing in its entirety is preferably made of sheet metal, and the shoulders comprise segmental pieces 73, which are connected to the elliptical wall of the engine-section and side walls of the gear-section, Figs. 14 and 15. These segments are soldered at their edges to said sections and are strengthened by soldering and riveting angle-pieces 74 thereto. For convenience of access to the working parts of the engine the engine-section is open at its upper half by being cut away through a portion of its length between the ends, and a removable flexible sheet 75 extends over this open portion. The front end of the engine-section is provided with a wall 76, which closes the same and prevents the lubricant from slushing out of the casing. This wall stiffens the front end of the engine-section and prevents the tendency of the casing to collapse. The flexible sheet 75 extends entirely around the engine-section, with its ends supported by overlapping the open or cut-away portion, and is retained between circumferential beads 76', pressed out in the engine-section, adjacent the end edges thereof. The sheet or covering 75 is provided with overhanging protective strips 77 on its inner surface, extending longitudinally thereof, which are adapted to fit over the side edges 78 at the cut-away portion of the engine-section, Figs. 9, 14, and 16. Strips of felt 79 or other packing are inserted between the overhanging strips and edges 78 of the opening to prevent the lubricant from splashing or creeping through the joints. The object of the overhanging strips is to turn the lubricant away from the joints as it runs down the inner surface of the sheet or covering to prevent the lubricant from leaking out. The ends of the flexible sheet or covering are turned into flanges 80, which meet in abutting relation under the casing, where they are secured together by plates 81 and bolts 82. The engine-section may also inclose the cylinders of the engine, and in the present case the structure illustrated discloses this feature. This structure comprises a head 83, which covers the front end of the cylinders 56 of the engine, (shown in Fig. 7 and in dotted outline in Figs. 14 and 16,) and the head is supported by brackets 85, rigid on the head and secured on the front ends of the supporting-rods 55 for the parts of the engine. The head is provided with a circumferential flange 86, formed with a bead 87, and around the cylinders and between this bead 87 and the bead 76' at the front end of the engine-section a flexible sheet-metal covering 88 is attached. This covering is preferably made of two pieces to enable the same to be opened when desired without disconnecting adjacent parts of the vehicle-frame. More particularly stated, the diagonal brace-rods 28 of the rear triangular frame are attached to the cylinders by means of bolts 89, which extend through the covering 88; and therefore in order to have the engine accessible it is made of two detachably-connected pieces, the ends of which are connected midway between the position of the bolts 89 at the top and bottom. In this way the covering can be readily opened without disconnecting the brace-rods and bolts. The upper edges of the two pieces are connected by interposed eyes 90, formed at the edges and disposed interiorly to be concealed from view, and a pin 91, interlocked with the eyes, Figs. 8 and 14. The lower edges of the pieces are connected by bolts in the same manner as the covering extending around the open portion of the engine-section.

The head 83 is provided with a tubular extension or neck 92, adapted to receive the live-steam pipe and exhaust-steam pipe, as well as the reversing and other necessary operating mechanism. The wall 76 is provided with sleeved openings 93, through which the supporting-rods 55 of the engine extend, and thereby the main body of the casing is supported in fixed relation to the engine, and as the head 83 is attached to the supporting-rods the front part of the casing is also held in fixed relation with the engine structure. The entire casing thus moves with the engine and with the differential yoke, with which it is also in fixed relation. The wall is also provided with openings 94 for the piston-rods of the engine and for the valve-stems, while openings 95 receive the reversing and other operating mechanism. Accordingly it will be observed that the parts of the casing are arranged in a manner to afford ready access to the internal parts of the motive mechanism and a perfectly oil-tight structure is obtained of a symmetrical and attractive form.

The differential gear is of special design and is particularly useful in connection with the present construction of rear axle. The bevel gear-wheels 48 of the differential gear, Fig. 10, are formed with annular flanges 96, which are adapted to abut and frictionally engage with each other. As the side plates of the axle-yoke are drawn up in place by the bolts the bevel gear-wheels, which are rigid on their live axles, are caused to bind between the flanges 96, so as to restrict to a certain extent the individual movement of the wheels when acting differentially. This stiffness between the bevel gear-wheels, and consequntly between the live axles with the road-wheels, tends to prevent skiddings of the wheels.

The outer surfaces of the annular flanges 96 are turned down true and afford a bearing upon which the spur-gear 97 is mounted. The preferred form of spur-gear consists of a toothed cylinder 98 and a web portion 99. The web portion is bolted to an internal flange 100 on the cylinder, Figs. 10 and 11. On the web portion of the spur-gear the pinions 101 are journaled, and these mesh with the bevel gear-wheels in the usual manner. The spur-gear is easily taken from its position after either half of the rear axle is disconnected, as is apparent by inspection of Fig. 10.

It will be noted that the main object which I have attained by the present construction of the rear triangular frame is a strong and rigid structure to stand the wear and tear of road travel and also one which permits of ready accessibility to moving parts by reason of the members of the frame being detachably connected.

In accordance with the provisions of the patent statutes I have described the principle of operation of my invention, together with the apparatus which I now consider to be the best embodiment thereof; but I desire to have it understood that the apparatus shown is only illustrative and that the invention can be carried out by other means.

What I claim as new, and desire to secure by Letters Patent of the United States, is—

1. In a vehicle, the combination of a body, a pair of axles, a frame rigidly attached to each of the axles, pivotal connections between each frame and the body, and pivotally-supported arches between the axles and the body which permit each of the frames to oscillate with its respective axle.

2. In a vehicle, the combination of a body, front and rear axles, non-overlapping frames which are pivotally secured to the body and are attached to the axles, and pivotally-supported arches between the axles and the body which permit each of the frames to oscillate with its respective axle.

3. In a vehicle, the combination of a front and a rear axle, a body, springs intermediate the body and axles, separate frames each rigidly attached to an axle and pivotally connected with the body, and pivotally-supported arches between the axles and the body which permit each of the frames to oscillate with its respective axle.

4. In a vehicle, the combination of front and rear axles, a body, springs therefor, front and rear frames rigidly secured respectively to the front and rear axles, separate pivotal connections between the frames and the body, and pivotally-supported arches between the axles and the body which permit each of the frames to oscillate with its respective axle.

5. In a vehicle, the combination of front and rear axles, a body, springs therefor, a triangular frame rigidly attached to each axle, the frames having their apices pivotally supported by the body independently of each other, and pivotally-supported arches between the axles and the body which permit each of the frames to oscillate with its respective axle.

6. In a vehicle, the combination of front and rear axles, arches therefor, pivotal connections between the axles and their respective arches, a body, springs intermediate the axles and body, and a frame rigidly attached to each axle.

7. In a vehicle, the combination of an axle, an arch therefor, and sockets and pivots between the arch and the axle which permit of relative oscillatory movement.

8. In a vehicle, the combination of an axle, an arch therefor, and a pivotal connection between the axle and arch which permits of relative oscillatory movement.

9. In a vehicle, the combination of a body, an axle, an arch therefor, a pivotal connection between the axle and arch which permits the former to oscillate, and body-supporting springs which are rigidly attached to the arch.

10. In a vehicle, the combination of a body, an axle, an arch therefor, a pivotal connection between the axle and arch which permits the former to oscillate, and spring-seats rigid on the arch.

11. In a vehicle, the combination of a body, an axle, an arch therefor, pivotal connections between the axle and arch, a frame attached to the axle and pivotally connected with the body, and a steering mechanism mounted on the frame.

12. In a vehicle, the combination of a spring-supported body, an axle, an arch therefor, pivotal connections between the axle and arch, a frame attached to the axle and pivotally connected with the body, a steering-lever mounted on the body, and a steering mechanism operatively connected with the lever and assembled on the frame.

13. In a vehicle, the combination of a spring-supported body, an axle, an arch therefor, pivotal connections between the axle and arch, a frame attached to the axle, a hanger on the body, and a head on the frame pivotally mounted in the hanger.

14. In a vehicle, the combination of a spring-supported body, an axle, an arch therefor, pivotal connections between the axle and arch, a frame attached to the axle, a hanger on the body, a bearing-ring carried thereby, and a head on the frame pivotally mounted in the bearing-ring, the head being tapered to permit of a limited tilting movement thereof relatively to the bearing-ring.

15. In a vehicle, the combination of front and rear axles, arches therefor, a body, body-supporting springs rigidly secured to the arches, front and rear frames rigid respectively with the front and rear axles and pivotally connected with the body, pivots at the ends of the arches, and sockets provided on the axles engaging the pivots of the arches.

16. In a vehicle, the combination of a body, front and rear arches, body-supporting springs rigidly secured to the arches, front and rear axles pivotally attached to the arches, frames rigidly secured to the axles, said frames each comprising a central strut member and braces, a hanger carried on the body, and separate pivotal connections between the strut members and hanger.

17. In a vehicle, the combination of a body, front and rear axles, body-supporting springs, a post or support arranged on one of the axles, a hanger rigidly secured to the body, a central strut pivoted at one end to the post or support and at the other end to the hanger, and diagonal brace-rods extending from the axle connected with the strut.

18. In a vehicle, the combination of a body, front and rear axles, arches therefor, body-supporting springs, one of the arches and axles being pivotally united, a post on said axle, a strut connected with said post, a rigid hanger on the body, a collar on the central strut, and brace-rods rigidly secured to the axle and collar.

19. In a vehicle, the combination of a body, front and rear axles, arches therefor, body-supporting springs, one of the axles being pivotally attached to its respective arch, a central post fixed on said axle, a central strut connected with the central post, a hanger fixed and braced on the body, a bearing-ring carried by the hanger with its axis disposed parallel to the axle, and a head on the central strut movably mounted in the bearing-ring.

20. In a vehicle, the combination of a body, body-supporting springs, axles, arches therefor, one of the axles being pivotally connected with its respective arch, a strut member in fixed relation to said axle, a hanger depending from the body, and a universal connection between the strut member and hanger.

21. In a vehicle, the combination of a body, body-supporting springs, axles, arches therefor, one of the axles being movably attached to its respective arch, a strut member relatively fixed to said axle, a hanger arranged on the body, a socket removably carried by the hanger, and a ball arranged on the strut member and mounted in the socket.

22. In a vehicle, the combination of a body, body-supporting springs, axles, arches therefor, one of the axles being pivotally secured to its respective arch, a strut member rigidly secured and braced to said axle, a hanger arranged on the body, a threaded boss on the hanger, a socket, a threaded pin thereon, a nut removably connecting the pin and boss, and a ball provided on the strut member and engaging in the socket.

23. In a vehicle, the combination of a body, a rear-axle arch, body-supporting springs rigidly secured on the arch, and an axle-frame detachably pivoted both to the axle-arch and the body.

24. In a vehicle, the combination of a body, a rear-axle arch, body-supporting springs rigidly secured on the arch, an axle-frame pivoted on the arch, the said frame comprising axle-sleeves, a differential yoke detachably connecting the sleeves, a central strut member, diagonal braces, and a pivotal connection between the frame and body.

25. In a vehicle, the combination of a body, an axle-arch, body-supporting springs, axle-sleeves pivotally connected with the ends of the axle-arch, a differential yoke detachably connecting the inner ends of the sleeves, the said yoke comprising side plates bolted to top and bottom plates, a central strut member removably secured to the differential yoke, and means pivotally supporting the central strut member on the body.

26. In a vehicle, the combination of a body, an axle-arch, body-supporting springs, axle-sleeves pivotally connected with the arch, a differential yoke detachably connecting the sleeves, the said yoke comprising side plates rigid on the inner ends of the sleeves and top and bottom plates bolting the side plates together, a central strut member removably connected with the side plates, means pivotally supporting the central strut member to the body, and diagonal brace-rods between the central strut member and axle-sleeves.

27. In a vehicle, the combination of a body, an axle-arch, body-supporting springs, axle-sleeves pivotally connected with the axle-arch, a differential yoke detachably connecting the sleeves, the said yoke comprising side plates rigid on the inner ends of the sleeve, and top and bottom plates bolting the side plates together, an engine, supporting-rods therefor, means removably securing the rear ends of the supporting-rods in the side plates of the yoke, diagonal brace-rods between the engine and axle-sleeves, and a pivotal connection between the engine and body.

28. In a vehicle, the combination of a rear-axle arch, axle-sleeves detachably supported on the arch, a differential yoke, the same comprising side plates rigid with the axle-sleeves and suitably bolted together, live axles mounted in the sleeves, and a differential gear, the bevel gear-wheels thereof being rigidly secured on the live axles and held in frictional engagement with each other by the bolted side plate of the yoke.

29. In a vehicle, the combination of a rear-axle arch, axle-sleeves, a differential yoke detachably connecting the sleeves, live axles mounted in the sleeves, adjustable bearings therefor, a bevel gear-wheel on the inner end of each live axle, annular flanges on the bevel gear-wheels held in frictional engagement with each other by the differential yoke, a spur gear-wheel revolubly mounted on said annular flanges, said spur-gear comprising a toothed cylinder and a web bolted thereto, and pinions carried on the web in mesh with the bevel gear-wheels.

30. In a vehicle, the combination of a differential yoke comprising side plates and top and bottom plates bolting the side plates together, said plates having front and rear surfaces, a rear casing member, a front casing member, flanges formed on said members, and means removably securing the flanges in oil-containing contact with the plates of the differential yoke.

31. In a vehicle, the combination with a differential yoke, comprising side plates, and top and bottom plates bolting the side plates together, said plates having flush front and rear surfaces, of a rear gear-casing member, a front gear-casing member, flanges formed on said members, means removably securing the flanges in oil-containing contact with the plates, and an engine-casing comprising removable sections and coöperating with said front gear-casing member to form an oil-containing housing for the engine and differential gear.

32. In a vehicle, the combination of a rear axle and gear-yoke, an arch therefor, pivotal connections between the axle and arch, an engine and gear structure in fixed relation to the axle, and a casing inclosing said structure also in fixed relation to the axle.

33. In a vehicle, the combination of a rear axle and gear-yoke, an engine and gear, an oil-containing casing for the latter, said casing comprising a rear member or cap and a front member consisting of a gear-section and an engine-section, and means removably connecting the members with the gear-yoke.

34. In a vehicle, the combination of an axle and gear-yoke, an engine and gear in fixed relation thereto, a rear casing member attached to the yoke, a front casing member comprising an integral gear-section and engine-section, said engine-section being open at its upper portion, a removable covering for the open portion thereof, and means removably connecting said casing members in oil-tight contact with the yoke.

35. In a vehicle, the combination of an axle and gear-yoke, an engine and gear, a rear casing member attached to the yoke, a front casing member comprising a gear-section and engine-section integrally connected, said engine-section being cut away at its upper half, a flexible sheet or covering extending over the cut-away portion, a wall closing the front end of the engine-section, and means removably securing the members to the yoke.

36. In a vehicle, the combination of an axle and gear-yoke, an engine and gear, a rear casing member attached to the yoke, a front casing member comprising a gear-section and engine-section integrally connected, said engine-section being cut away at its upper half, a flexible sheet or covering extending over the cut-away portion thereof, overhanging strips on the inner surface of the flexible sheet or covering disposed over the edges of the open portion, and means securing the members to the yoke.

37. In a vehicle, the combination of an axle and gear-yoke, an engine and gear, a rear casing member flanged at its edges, a reinforcing-frame overlying said flanged edges, means removably securing the frame and cap to the yoke, a front casing member comprising a gear-section and engine-section integrally connected, means removably attaching the gear-section to the yoke, a cylinder-head member, and removably-connected sheets extending around the cylinders.

38. In a self-propelled vehicle, the combination of an axle, a motive-power agency supported by the axle, a fluid-tight casing which incloses the said agency, a wall which divides the casing into chambers, and a support for the outer end of the casing that is carried by the motive-power agency.

In witness whereof I have hereunto set my hand this 8th day of October, 1903.

AUGUSTUS A. BALL, JR.

Witnesses:
   DUGALD McK. McKILLOP,
   JOHN J. WALKER.